United States Patent
Fukuzawa

[11] Patent Number: 5,933,807
[45] Date of Patent: *Aug. 3, 1999

[54] SCREEN CONTROL APPARATUS AND SCREEN CONTROL METHOD

[75] Inventor: Keiji Fukuzawa, Kanagawa, Japan

[73] Assignee: Nitsuko Corporation, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,007

[22] Filed: Dec. 15, 1995

[30] Foreign Application Priority Data

Dec. 19, 1994 [JP] Japan .................................. 6-315237

[51] Int. Cl.$^6$ ...................................... G10L 5/00
[52] U.S. Cl. ...................... 704/275; 704/276; 704/232; 704/233; 704/235
[58] Field of Search .............................. 395/2, 2.41, 2.84, 395/2.42, 2.85, 2.11, 2.44

[56] References Cited

U.S. PATENT DOCUMENTS

| | | | |
|---|---|---|---|
| 4,741,038 | 4/1988 | Elko et al. | 381/92 |
| 5,150,449 | 9/1992 | Yoshida et al. | 395/2 |
| 5,163,111 | 11/1992 | Baji et al. | 395/22 |
| 5,175,793 | 12/1992 | Sakamoto et al. | 395/2 |
| 5,175,794 | 12/1992 | Tattersall | 395/2 |
| 5,357,596 | 10/1994 | Takebayashi et al. | 395/2.84 |
| 5,377,302 | 12/1994 | Tsiang | 395/2.44 |
| 5,386,494 | 1/1995 | White | 395/2.84 |
| 5,473,701 | 12/1995 | Cezanne et al. | 381/92 |
| 5,528,728 | 6/1996 | Matsuura et al. | 395/2.41 |
| 5,617,526 | 4/1997 | Oran et al. | 395/326 |

OTHER PUBLICATIONS

Schmandt et al., ("Augmenting a Window System with Speech Input", Computer Magazine, Aug. 1990, vol.23, Issue 8, pp. 50–56).
Lie et al., ("SCREAM: Screen based navigation in voice messages", Visual languages, May 1993, pp. 401–405).
Berkley et al., ("A multimodal Teleconferencing System Using Hands–free Voice Control", ICSLP'94, Yokohama, Sep. 18–22, 1994, pp. S11–8–1 throgh S11–8–4).

Primary Examiner—David R. Hudspeth
Assistant Examiner—Vijay B. Chawan
Attorney, Agent, or Firm—Staas & Halsey LLP

[57] ABSTRACT

A screen control apparatus and a screen control method enabling an operator to instruct a display apparatus both of a type and an amount of processing in an intuitive and an easy way by voice to provide good human interfacing. The screen control apparatus comprises a sound input means for receiving voice instruction on a screen and generating a sound signal, a sound recognition means for recognizing sound signal, a sound continuation detection means for detecting the sound continuation of the sound signal, and a screen processing means for processing said picture on the screen in accordance with the recognized sound signal for a time of the detected sound continuation. The screen control method includes the steps of receiving voice for instructing a processing a picture on a screen and generating a sound signal, extracting a sound feature of the sound signal, discriminating the sound signal in accordance with the extracted sound feature to generate a recognized sound signal, detecting the sound continuation of the sound signal, and processing displayed picture on the screen in accordance with said recognized sound signal by a time of said detected sound continuation.

15 Claims, 9 Drawing Sheets

PHONEME DISCRIMINATION SERIES

SCREEN CONTROL APPARATUS AND SCREEN CONTROL METHOD

BACKGROUND OF THE INVENTION

1. Field of the Invention

The present invention relates to a screen control apparatus which accepts voice instructions for processing a graphic displayed on a screen and performs the processing on the screen according to the voice instructions, more particularly relates to a screen control apparatus which designates the amount of the processing in accordance with the length of a certain phoneme in the voice instruction.

2. Description of the Related Art

Direct voice instruction of the operation of various types of apparatuses enables easy and efficient operation of the apparatuses and leads to a remarkable improvement in human interfacing. Recent progress in voice recognition technology has led to the proposal of several methods for controlling apparatuses by voice. For example, methods for voice execution of processing such as movement, enlargement, reduction, and/or rotation on a displayed object on the screen of a workstation or personal computer have been proposed.

In those methods, the following processing is carried out; recognition of a word indicating a certain processing enunciated by an operator toward a voice inputting means, for example, a microphone connected to a workstation, determination of the processing corresponding to the recognized word by reference to a previously defined table of correspondence between certain words and processing, and execution of the processing on the screen. In other words, the method consists of recognizing the inputted voice as a command and executing the processing as processing the same as with a command ordinarily inputted from a keyboard or other means to control the screen.

The existing methods of screen control by voice instructions carry out a fixed amount of movement, enlargement, reduction, and/or rotation of a displayed object with a single command, so it is impossible to move a displayed object by exactly a desired distance, to enlarge or reduce it by exactly a desired magnification, or to rotate it by exactly a desired angle by a single operation. To execute such a desired amount of processing, it is necessary to perform separate additional operations, such as inputting a number with a keyboard, enunciating a number to be recognized, or inputting instructions for the start and the end of the processing. Since such operations are as cumbersome as the ordinary graphic operations using a keyboard or other means, it is hard to say that these apparatuses provide good human interfacing taking full advantage of the convenience of voice commands.

SUMMARY OF THE INVENTION

An object of the present invention is to provide a screen control apparatus which enables voice instructions of a type of operation and an amount of processing in an intuitive and an easy manner for a display apparatus.

Another object of the present invention is to provide a screen control method which enables voice instruction of both a type and an amount of processing for a display apparatus.

According to the present invention, there is provided a screen control apparatus including: a sound input unit for receiving voice instruction for processing of a picture on a screen and generating a sound signal; a sound recognition unit for recognizing the sound signal from the sound input unit to generate a recognized sound signal for indicating the processing of the picture on the screen; a sound continuation detection unit for detecting the sound continuation of the sound signal from the sound input unit; and a screen processing unit for processing the picture on the screen in accordance with the recognized sound signal for a time of said detected sound continuation.

Also, according to the present invention, there is provided an screen control method including: receiving voice for instructing a processing of said picture and generating a sound signal; extracting a sound feature of the sound signal; discriminating the sound signal in accordance with the extracted sound feature to generate a recognized sound signal for indicating the processing of the displayed picture; detecting a sound continuation of the sound signal from the voice signals; and processing the displayed picture on the screen in accordance with the recognized sound signal for a time of the detected sound continuation.

BRIEF DESCRIPTION OF THE DRAWINGS

These and other objects and features of the present invention will become more apparent by the following description of the preferred embodiments made with reference to the attached drawings, wherein.

DESCRIPTION OF THE PREFERRED EMBODIMENTS

The first embodiment of the screen control apparatus according to the present invention will be explained below with reference to FIGS. 1 to 4.

Figure 1:
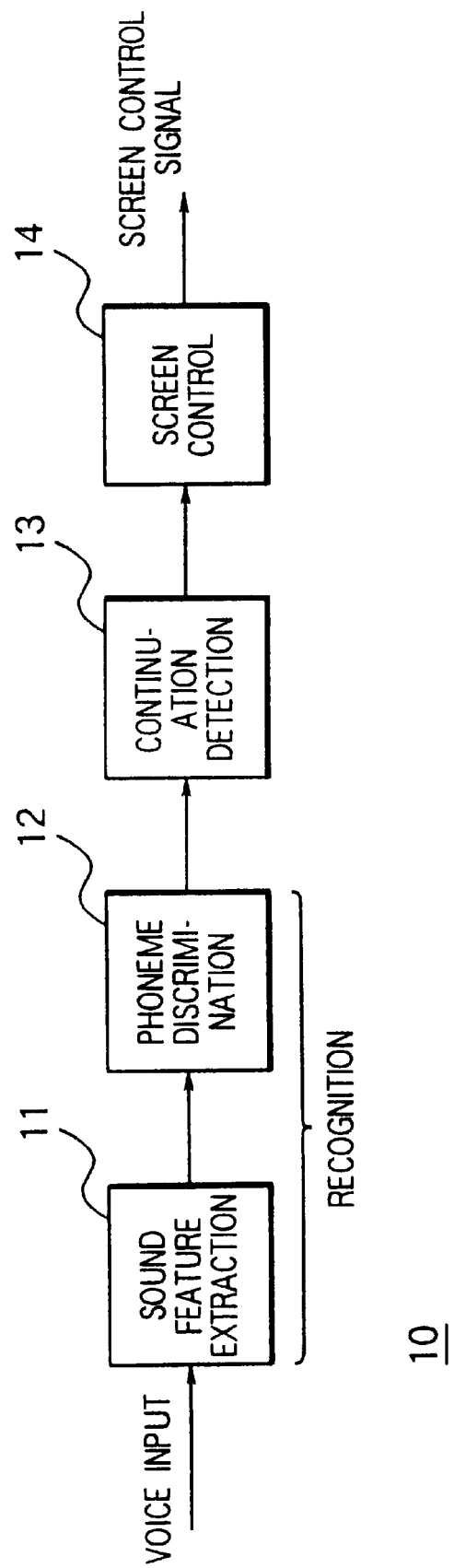
FIG. 1 is a view of a configuration of a screen control apparatus according to a first embodiment of the present invention.

FIG. 1 is a view of the configuration of a screen control apparatus according to the first embodiment.

The screen control apparatus 10 comprises a sound feature extraction unit 11, phoneme discrimination unit 12, phoneme continuation detection unit 13, and screen control unit 14.

The configuration and operation of each unit is explained as follows.

The sound feature extraction unit 11 analyzes the inputted sound signals to extract the sound features from them and outputs the features to the phoneme discrimination unit 12. The analyzing conditions in the sound feature extraction unit 11 are shown in TABLE 1. As a result of this analysis, the data of 5 frames (50 msec) of a mel-scale 16-channel Fast Fourier Transform (FFT) result are outputted as the sound features to the phoneme discrimination unit 12.

TABLE 1

| Condition | Operating Value |
| --- | --- |
| Sampling frequency | 12 kHz |
| Window function | Humming window |
| Window width | 21.3 msec |
| Analysis interval | 10 msec |
| Analyzing method | FFT (256 sample points) |

Figure 2:
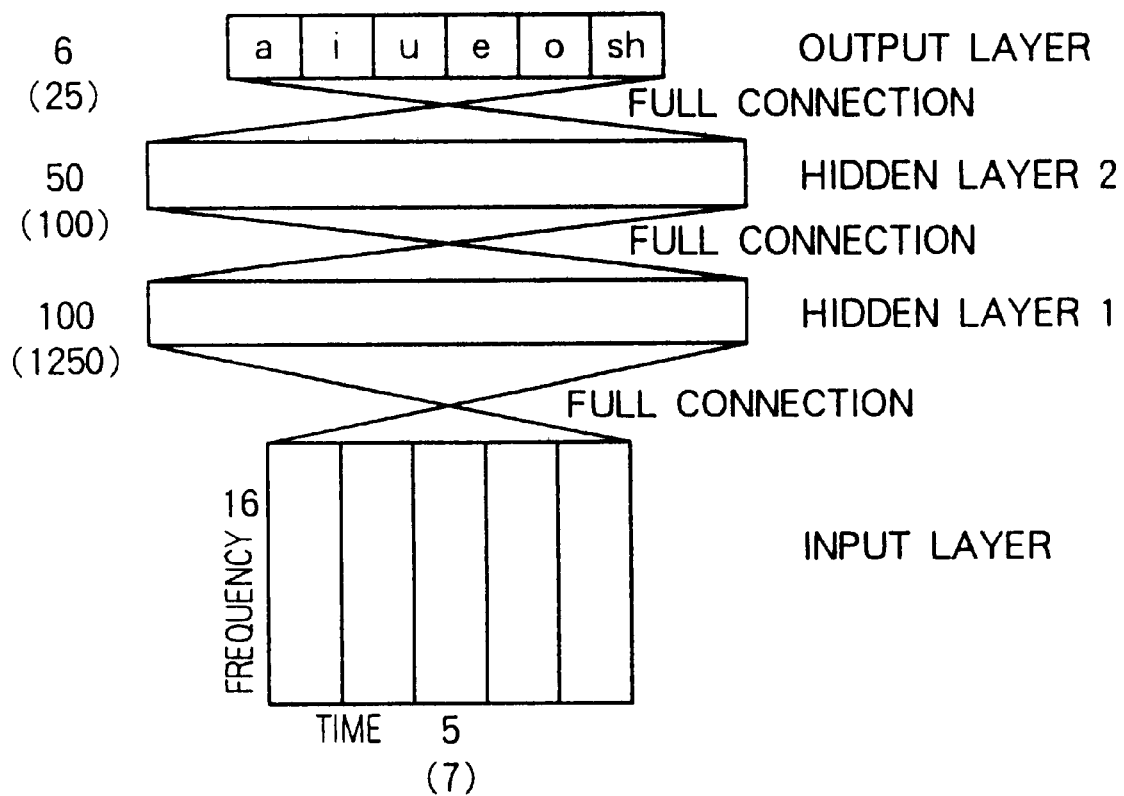
FIG. 2 is a view of the configuration of a neural network in a phoneme discrimination unit shown in FIG. 1.

The phoneme discrimination unit 12 discriminates the phoneme based on the sound feature data inputted from the sound feature extraction unit 11 and outputs the results of discrimination to the phoneme continuation detection unit 13. The phoneme discrimination unit 12 comprises the 4-layer feed-forward neural network as shown in FIG. 2. This neural network has 16*5=80, 100, 50, and 6 units in the input layer, hidden layer 1, hidden layer 2, and output layer, respectively.

The phoneme discrimination unit 12 discriminates the 6 phonemes, including 5 vowels and "/sh/" shown in TABLE 2, with this neural network.

TABLE 2

| Discriminated phonemes |
| --- |
| /a/,/i/,/u/,/e/,/o/,/sh/ |

It is necessary for this neural network to learn in advance to make a circuit network which is able to discriminate phonemes. In this embodiment, the network learned the 6 phonemes shown in TABLE 2 using 2620 words pronounced by a male speaker and established a circuit network which has enough ability to discriminate the 6 phonemes.

Output from the phoneme discrimination unit 12 is made in the form of the phoneme discrimination pattern array $G=(g_1, g_2, \ldots, g_t, \ldots, g_T)$. Element $g_t$ in this phoneme discrimination pattern array G indicates the output vector at time t, and the number of elements T indicates the length of the voice frame. The number of vector dimensions of output vector $g_t$ is the number of output units of the neural network. It is 6 in this embodiment.

The phoneme continuation detection unit 13 detects continuation of a same phoneme based on the phoneme discrimination pattern array G which is outputted by the phoneme discrimination unit 12. During the continuation, it outputs signals indicating the continuation to the screen control unit 14. Specifically, it observes the output level of each unit in the output layer of the neural network in the phoneme discrimination unit 12 and measures the time during which the average level of n number of frames are maintained at a level H. If the time exceeds the minimum continuation time Lmin, it judges and determines that the sound signals of the phoneme are continuously inputted. Then, it outputs signals indicating the continuation of the phoneme to the screen control unit 14 during the period in which the continuation is detected.

The operation of the phoneme continuation detection unit 13 is explained concretely as follows with reference to FIG. 3.

Figure 3:
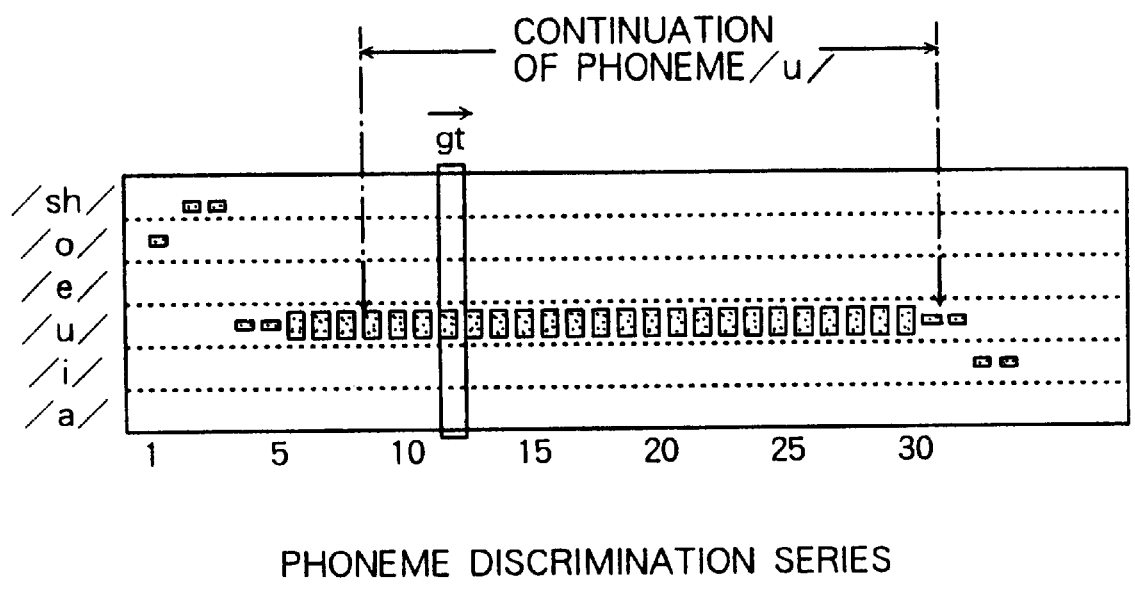
FIG. 3 is a view explaining a method of detecting continuation of phonemes executed in a phoneme continuation detecting unit shown in FIG. 1.

FIG. 3 is a view explaining the detection of continuation of phonemes and shows the output values by 10 msec of a 6-dimension vector $g_t$ corresponding to the output layer of the neural network in the phoneme discrimination unit 12. In this embodiment, the minimum continuation time Lmin is 5 frames.

In the example shown in FIG. 3, the output of the phoneme "/u/" is started at frame 4, and the output level is raised in frames 6 through 30. In frames 31 and 32, a small level output is observed. Consequently, if the average output level from frame 5 to frame 9 is higher than the specified value H, the continuation of the phoneme "/u/" is detected at frame 9, and the signals indicating the continuation are outputted. When a lower output level continues in frames 31 and 32 and the average output level becomes lower than the specified value H, the signals indicating the continuation are stopped immediately. As a result, the signals that indicate the continuation of phoneme "/u/" are outputted in frames 9 through 31.

When signals indicating the continuous input of a specific phoneme are inputted from the phoneme continuation detection unit 13, the screen control unit 14 executes the specified processing corresponding to the phoneme on the graphic on the screen of the display apparatus while the signals are being inputted.

TABLE 3 shows the screen processing corresponding to the phonemes detected.

TABLE 3

| Detected phoneme | Screen operation |
| --- | --- |
| /a/ | Move pointer to right |
| /i/ | Move pointer to left |
| /u/ | Move pointer upward |
| /e/ | Move pointer downward |
| /o/ | Enlarge window in which pointer is located |
| /sh/ | Reduce window in which pointer is located |

This processing of the display screen will be described concretely with reference to FIG. 4.

Figure 4:
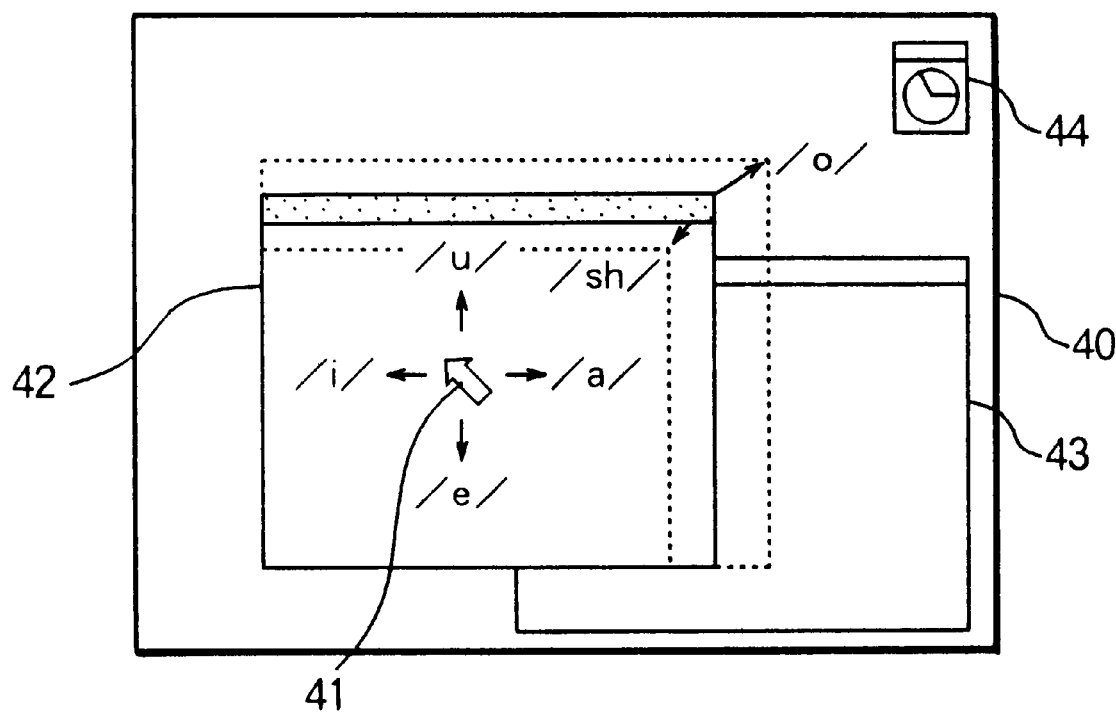
FIG. 4 is a view explaining processing of a picture on a screen controlled by the screen control apparatus of the present invention.

FIG. 4 is a view explaining the operation on the display screen. It shows a pointer 41, a first window 42, a second window 43, and a clock tool 44 in the display screen 40. The display screen 40 usually appears when a window system is started on a workstation or a personal computer.

The screen control unit 14 moves the pointer 41 to the right at a certain speed while the signals are being inputted, when the signals indicating the continuation of the phoneme "/a/" are inputted from the phoneme continuation detection unit 13. Similarly, the screen control unit 14 moves the pointer 41 to the left when the signals indicating the continuation of the phoneme "/i/" are inputted, moves the pointer 41 upward when the signals indicating the continuation of the phoneme "/u/" are inputted, and moves the pointer 41 downward when the signals indicating the continuation of the phoneme "/e/" are inputted, at a certain speed in all cases. When the signals indicating the continuation of the phoneme "/o/" are inputted, the screen control unit 14 enlarges the window in which the pointer 41 is located, that is, the first window 42 in the display screen 40 in FIG. 4, gradually at a certain speed, and when signals indicating the continuation of the phoneme "/sh/" are inputted, the screen control unit 14 reduces the first window 42 in which the pointer 41 is located in the same way at a certain speed.

The operation of the screen control apparatus 10 will be explained concretely as follows.

When a voice instruction is inputted to the display apparatus which is controlled by the screen control apparatus 10, the sound feature extraction unit 11 analyzes the voice instruction to extract its features, which are then inputted in units of one frame (10 msec) to the neural network in the phoneme discrimination unit 12. In the phoneme discrimination unit 12, the neural network discriminates the phonemes in real-time and outputs the results of the discrimination in 5 frames with the discrimination results in previous frames as a phoneme discrimination pattern array G. Then, the phoneme continuation detection unit 13 determines the average output level for each phoneme in the 5 frames based on the phoneme discrimination pattern array G. If the average output level is higher than the specified value H, it is judged that the phoneme is being inputted continuously, and the signals indicating the continuation of the phoneme are outputted to the screen control unit 14. Based on the signals, the screen control unit 14 continuously performs the screen operation corresponding to the phoneme.

Thus, the screen control apparatus in the first embodiment makes it possible to execute certain processing on the display screen by simply enunciating a certain sound. Furthermore, the amount of the processing can be adjusted by the length of the continuous vocalization. Consequently, by continuing and stopping vocalization while looking at the screen, an appropriate amount of a certain processing on the screen can be performed.

The screen control apparatus 10 in the first embodiment, which discriminates simple phonemes and detects their continuation, has a simple configuration. Even when a neural network is used as a means of phoneme discrimination as in this embodiment, such a unit can be made of a relatively simple neural network.

The second embodiment of the screen control apparatus of the present invention will be explained as follows with reference to FIGS. 5 to 7.

Figure 5:
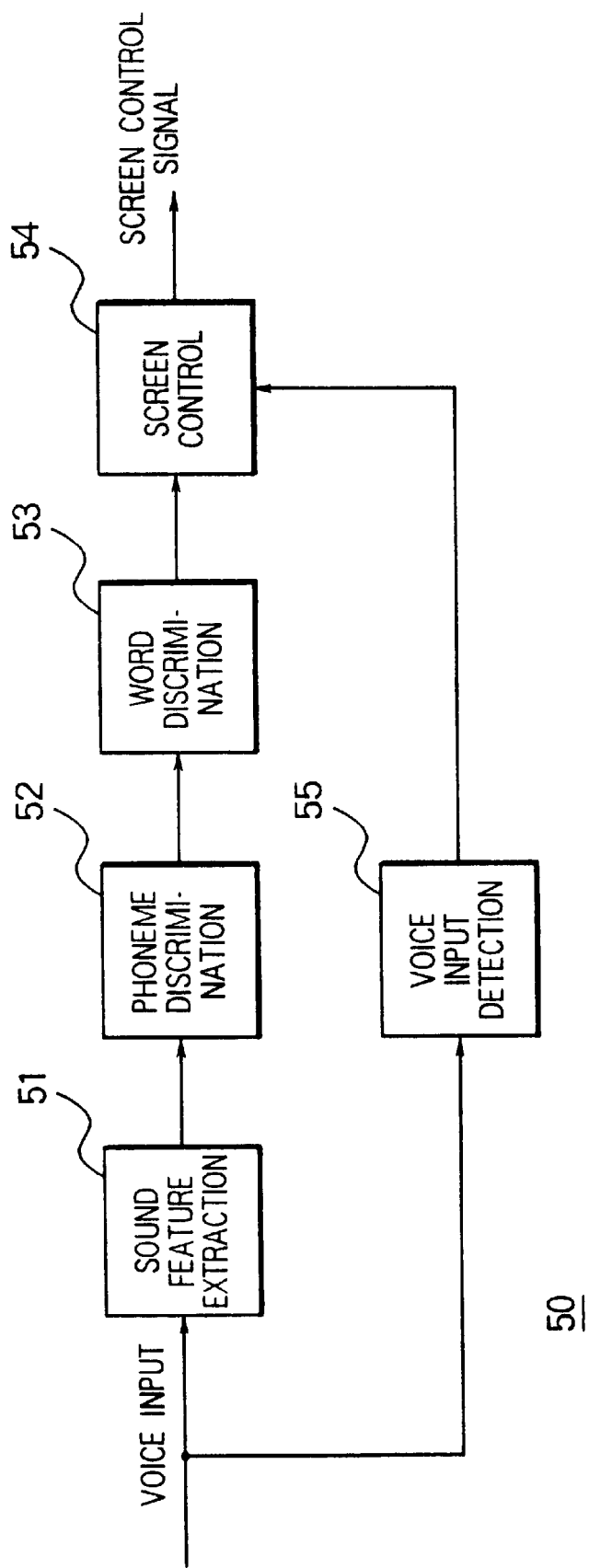
FIG. 5 is a view of the configuration of a screen control apparatus according to a second embodiment of the present invention.

FIG. 5 is a view of the configuration of the second embodiment of the screen control apparatus according to the present invention.

The screen control apparatus 50 comprises a sound feature extraction unit 51, phoneme discrimination unit 52, word discrimination unit 53, screen control unit 54, and voice input detection unit 55.

An explanation of the configuration and operation of each unit follows.

The sound feature extraction unit 51, which has almost the same configuration as that of the sound feature extraction unit 11 in the first embodiment mentioned above, analyzes inputted sound signals by the conditions as shown in TABLE 1 to extract the sound features and outputs the features to the phoneme discrimination unit 52. In the second embodiment, however, the data of 7 frames (70 msec) of the FFT result are outputted as the sound features.

The phoneme discrimination unit 52 discriminates phonemes based on the sound feature data inputted from the sound feature extraction unit 51 and outputs the discrimination results to the phoneme continuation detection unit 53. Like the first embodiment, it comprises a 4-layer feed forward neural network. However, as shown in FIG. 2, the neural network in the phoneme discrimination unit 52 in the second embodiment has 16*7=112, 1250, 100, and 25 units in the input layer, hidden layer 1, hidden layer 2, and output layer, respectively. The neural network discriminates the 25 phonemes shown in TABLE 4.

TABLE 4

Discriminated phonemes

/b/,/d/,/g/,/p/,/t/,
/k/,/m/,/n/,/N/,/s/,
/sh/,/h/,/z/,/ch/,/ts/,
/zh/,/r/,/w/,/y/,/a/,
/i/,/u/,/e/,/o/,/Q/

The neural network of the phoneme discrimination unit 52 has also learned 2620 words pronounced by a certain male speaker to establish a circuit network that is able to discriminate the 25 phonemes shown in TABLE 4.

As in the first embodiment, output from the phoneme discrimination unit 12 is made the phoneme discrimination pattern array G=($g_1, g_2, \ldots g_t, \ldots, g_T$). The number of dimensions of the output vector $g_t$ is the number of the output units in the neural network. It is 25 in the second embodiment.

The word discrimination unit 53 detects a specified word based on the phoneme discrimination pattern array G outputted from the phoneme discrimination unit 52 and outputs the signals indicating the result to the screen control unit 54. Specifically, the word discrimination unit 53 observes the output level of each unit in the output layer of the neural network in the phoneme discrimination unit 52 and measures the time during which the average level of n number of frames is maintained at a certain level H. If the time exceeds the minimum continuation time Lmin, the word discrimination unit 53 judges that the sound signals of the phoneme are inputted. Then, the word discrimination unit 53 compares phoneme series that are detected one after another with character series of the words to be discriminated, which have been stored in advance in a memory, not shown in any figures, in the word discrimination unit 53. If the phoneme series corresponds to one of the character series, the word discrimination unit 53 judges that the word is inputted as a sound signal and outputs the signal indicating the judgement to the screen control unit 14.

The voice input detection unit 55 outputs voice detection signals to the screen control unit 54 while the voice input is being detected. Specifically, it measures the energy levels of the signals of the inputted voice instructions, compares them with the specified threshold level, and detects the voice detection signals if the energy level of the inputted voice signals is higher than the threshold level.

The screen control unit 54 executes certain processing for the display apparatus for a certain period based on the results of the word discrimination inputted from the word discrimination unit 53 and the voice detection signals inputted from the voice input detection unit 55.

The screen control unit 54 determines processing to be executed based on the word inputted from the word discrimination unit 53 and executes the processing on the screen of the display apparatus for a period in which voice detection signals are being inputted from the voice input detection unit 55. In other words, while the end phoneme of a specified word continues to be vocalized after the word is pronounced, the screen control unit 54 continues to execute the operation on the screen determined by the word.

TABLE 5 shows the screen operations corresponding to the discriminated words. In TABLE 5, the Japanese instruction "migi" in Japanese means "right", "hidari" means "left", "ue" means "up", "shita" means "downward", "kakudai" means "enlargement", and "shukusyo" means "reduction" in English.

TABLE 5

| Detected word | Screen operation |
| --- | --- |
| /migi/ | Move pointer to right |
| /hidari/ | Move pointer to left |
| /ue/ | Move pointer upward |
| /shita/ | Move pointer downward |
| /kakudai/ | Enlarge window in which pointer is located |
| /shukusyo/ | Reduce window in which pointer is located |

The operation of the screen control apparatus 50 in the second embodiment will be explained concretely as follows with reference to FIGS. 6 and 7.

Figure 6:
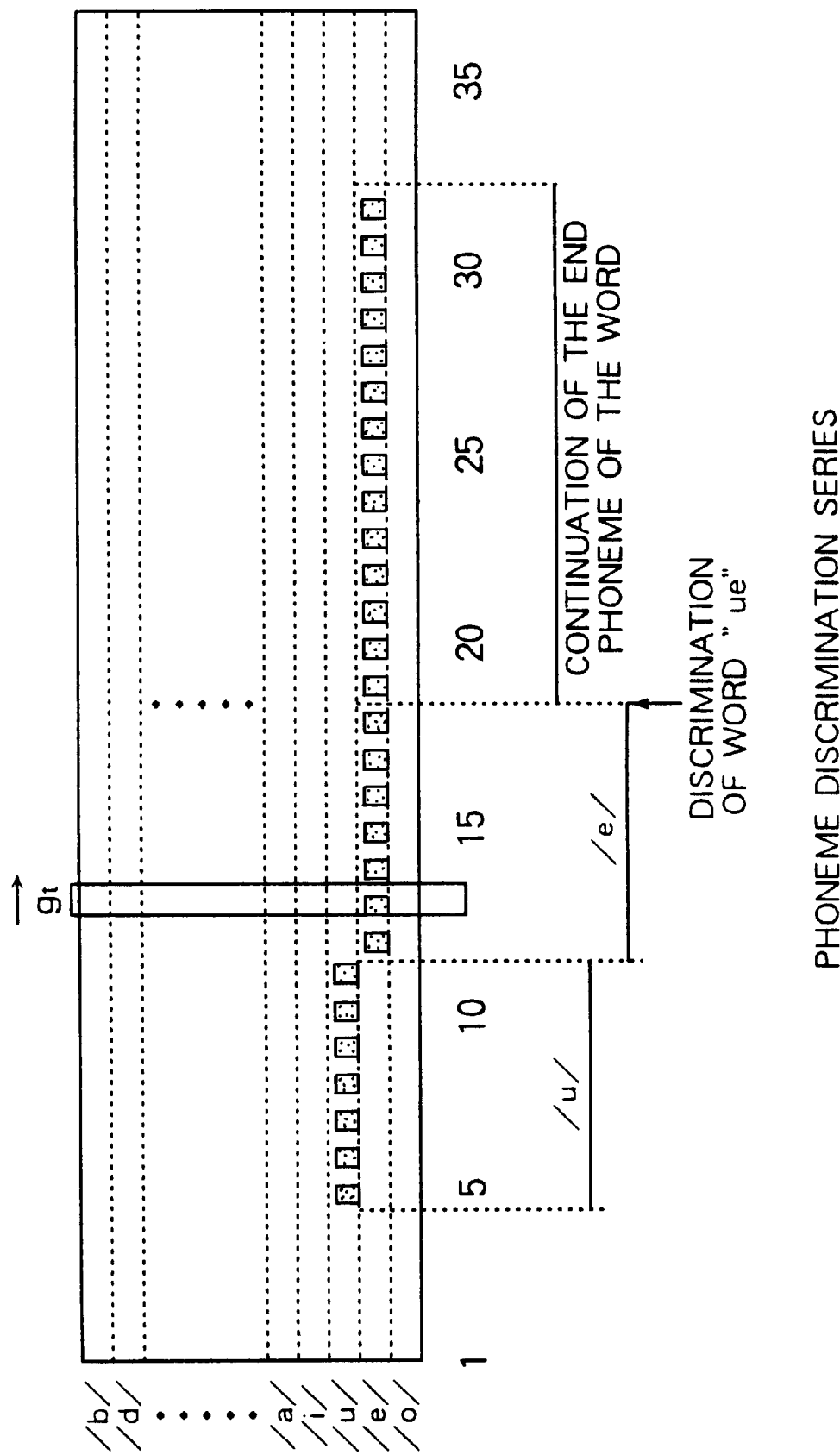
FIG. 6 is a view explaining a method of detecting phonemes, discrimination of a word, and detecting the continuation of the end phoneme executed in the screen control apparatus shown in FIG. 5.

FIG. 6 is a view explaining the detection of phonemes, discrimination of words, and continuation of the end phonemes.

In the screen control apparatus 50, the inputted voice signals are analyzed in the sound feature extraction unit 51 to extract an output vector for each frame. The phoneme discrimination unit 52 discriminates phonemes in every 7 frames. In the example shown in FIG. 6, a significant output level for the phoneme "/u/" is observed during 7 frames from frame 5 to frame 11, and a significant output level for the phoneme "/e/" is observed during 21 frames from frame 12 to frame 32. As a result, the phoneme discrimination unit 52 discriminates the phoneme "/u/" at frame 11 and phoneme "/e/" at frame 18, and consequently, the word discrimination unit 53 discriminates a word "ue" (upward) at frame 18.

On the other hand, the voice input detection unit 55 observes the energy levels of the input voice signals to detect an energy level exceeding the specified threshold level in frames 5 through 32, during which the voice input detecting unit 55 outputs the signals indicating that the voice signals are inputted to the screen control unit 54.

When the signals indicating the detection of a word "ue" (upward) are outputted from the word discrimination unit 53, the screen control unit 54 outputs the signals to execute the screen operation corresponding to the word "ue" (upward). Then, the screen control unit 54 checks signals from the voice input detection unit 55 after the input of the detection signals for the word "ue" (upward) and further checks whether the voice input exists continuously from the word. In other words, it checks whether the end phoneme of the word "ue" (upward) continues to be enunciated. Then, the screen control unit 54 continues to output the signals to execute the screen operation during the period in which the signals from the voice input detection unit 55 continue to be inputted following the signal of the detection of the word. In the embodiment shown in FIG. 6, the screen operation is continued during the period from frame 19 to frame 32 as a period in which the end phoneme continues. When the signals indicating the existence of an inputted voice instruction from the voice input detection unit 55 are terminated at frame 33, the screen control unit 54 finishes outputting the signals for the screen operation.

The screen operation will be explained as follows with reference to FIG. 7.

Figure 7:
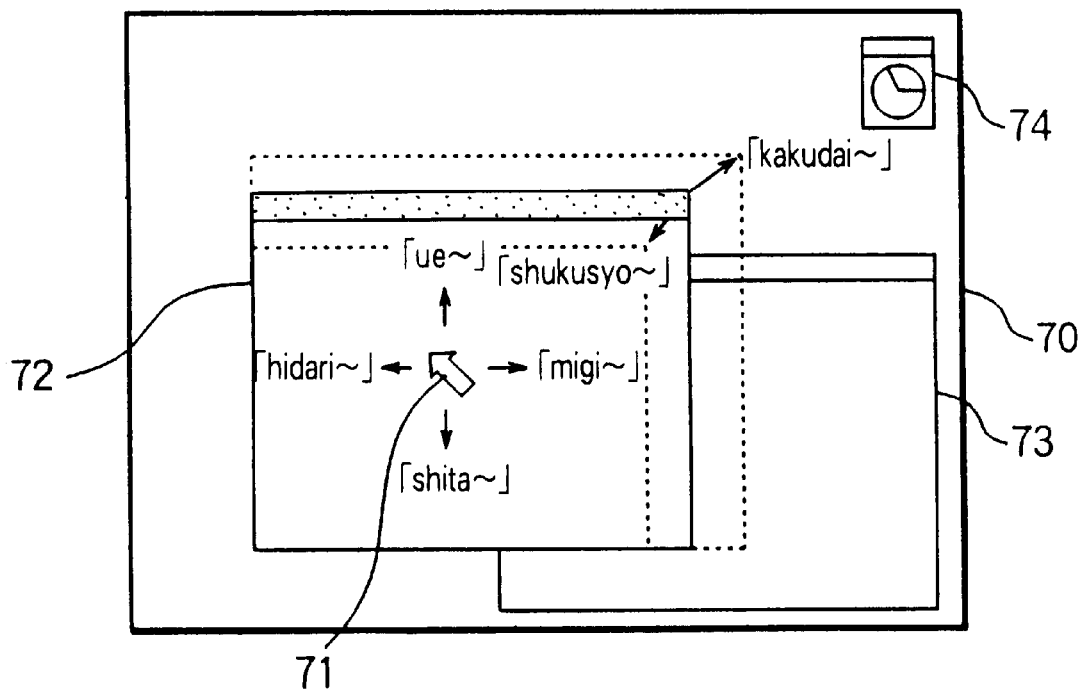
FIG. 7 is a view explaining the operation of a picture on a screen controlled by the screen control apparatus of the present invention.

FIG. 7 is a view explaining the operation on a display screen. It shows a pointer 71, a first window 72, a second window 73, and a clock tool 74 in a display screen 70.

The screen control unit 54 moves the pointer 71 to the right at a certain speed when the signal indicating that a word "migi" (right) is discriminated, in other words indicating that a word "migi" (right) is inputted, from the word discrimination unit 53. Similarly, the screen control unit 54 moves the pointer 71 to the left when the signal indicating a word "hidari" (left) is inputted, moves the pointer 71 upward when the signal indicating the word "ue" (upward) is inputted, and moves the pointer 71 downward when the signal indicating the word "shita" (downward) is inputted, at a certain speed in all cases.

When the signal indicating the word "kakudai" (enlargement) is inputted, the window in which the pointer 71 is located, that is, the first window 72 in the display screen 70 in FIG. 7, is gradually enlarged at a certain speed, and when the signal indicating the word "shukusyo" (reduction) is inputted, the first window 72 in which the pointer 71 is located is reduced at a certain speed. These processing, such as moving a pointer and enlarging/reducing a window, are executed continuously while the vocalization of the end phoneme of each word is continued and the input of the signals indicating the continuation from the voice input detection unit 55 is continued. In other words, while the vocalization of the word "ue" (upward) with an extended end phoneme as "ue-" is continued, the pointer 71 keeps moving upward, and while the vocalization of the word "kakudai" (enlargement) with an extended end phoneme as "kakudai-" is continued, the window 72 keeps enlarging.

Thus, the screen control apparatus of the second embodiment make it possible to execute a certain amount of a certain processing on the display screen by voice.

In the second embodiment, especially, the type of the processing is indicated by a word and the amount of the processing is determined by the length of the extended end phoneme, so that the processing can be indicated by any word which has no relation to the phoneme to be extended. As a result, the number of processing operations which can be directed by voice becomes infinite, and the screen control apparatus of the present invention can handle various types of complex processing.

In addition, in the screen control apparatus of the second embodiment, processing can be specified by vocalization of a word, so that an operator can direct the processing using a word which indicates the operation of the processing. The method of indication is almost equal to the oral direction which we do ordinarily, thus a screen control apparatus of the present invention that offers better human interfacing is provided.

The third embodiment of the screen control apparatus of the present invention will be explained as follows with reference to FIGS. 8 and 9.

Figure 8:
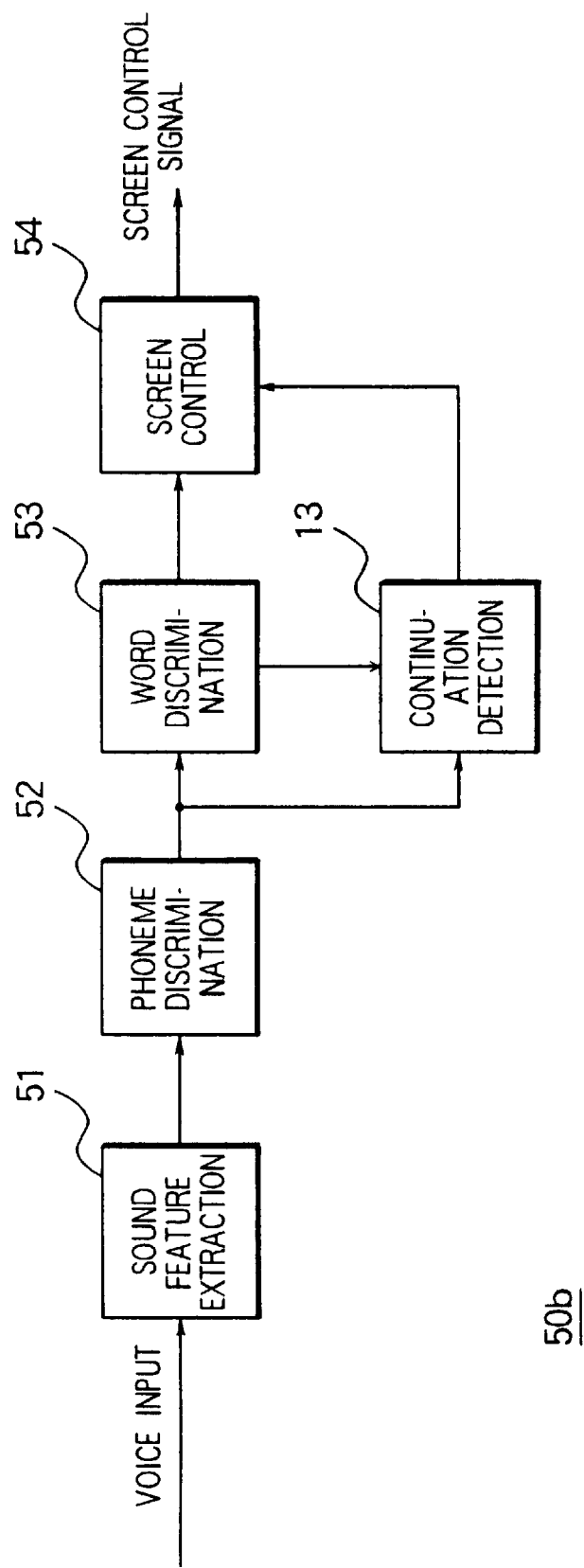
FIG. 8 is a view of the configuration of a screen control apparatus according to a third embodiment of the present invention.

FIG. 8 is a view of the configuration of the third embodiment of the screen control apparatus according to the present invention.

The screen control apparatus 50b comprises the sound feature extraction unit 51, the phoneme discrimination unit 52, the word discrimination unit 53, the screen control unit 54, and the phoneme continuation detection unit 13.

The third embodiment of the screen control apparatus 50b is different in the method of detecting the continuation of the end phoneme from the second embodiment and uses almost the same method as the first embodiment of the screen control apparatus.

So in the phoneme continuation detection unit 13, the continuation of a same phoneme is detected based on the phoneme discrimination pattern array G which is outputted by the phoneme discrimination unit 52. If the continuous phoneme is equal with the end phoneme of the word discriminated in the word discrimination unit 53, the phoneme continuation detection unit 13 outputs signals indicating the continuation to the screen control unit 54.

Figure 9:
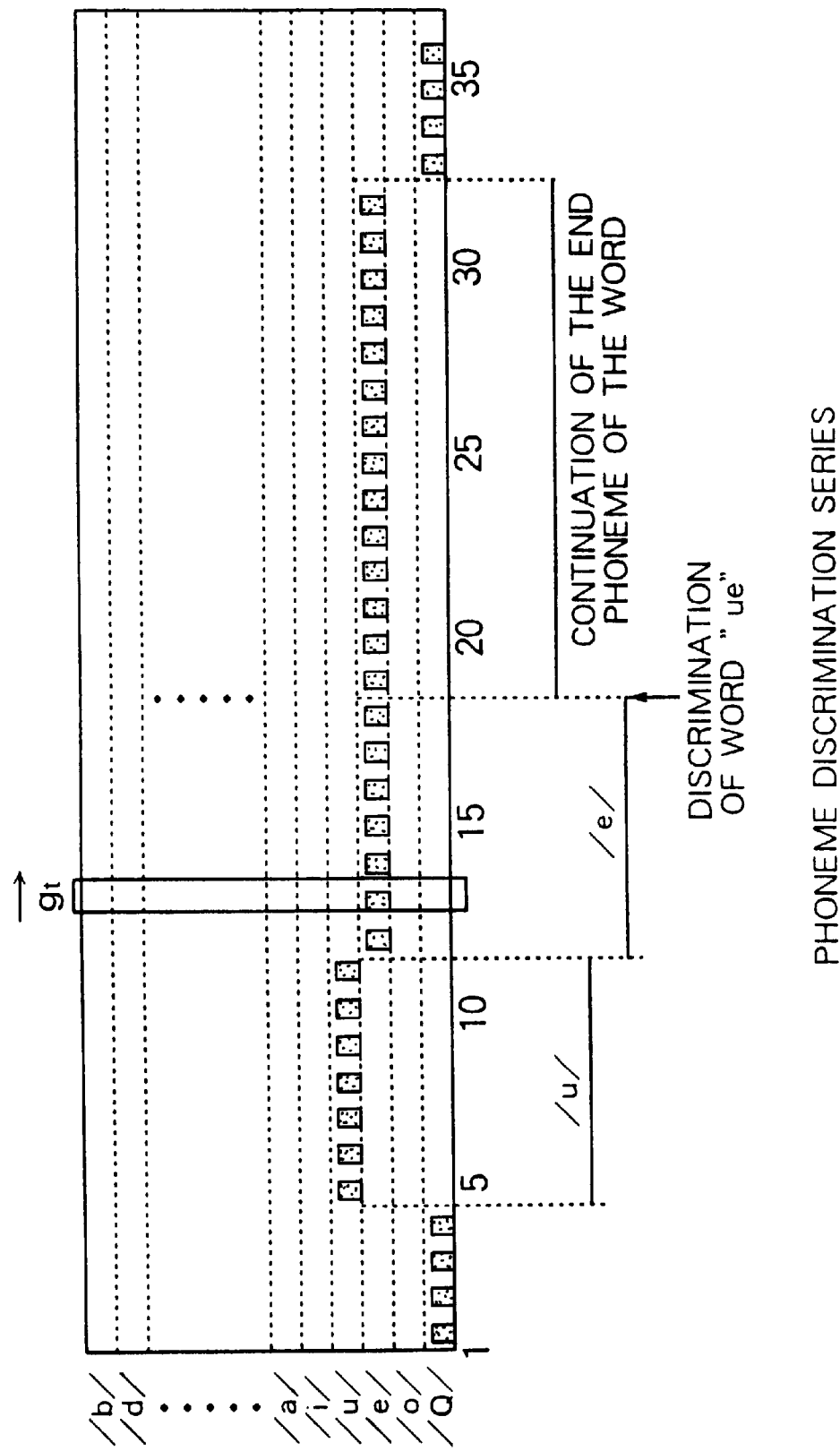
FIG. 9 is a view explaining a method of detecting phonemes executed in the screen control apparatus according to the third embodiment.

FIG. 9 is a view explaining detection of a phoneme, discrimination of words, and continuation of the end phonemes in such a case as above.

As shown in FIG. 9, in such a method, when the word discrimination unit 53 discriminates a word "ue" (upward) at frame 18, the word discrimination unit 53 continues to compare the discriminated phonemes at and after frame 19 and detects the continuation of the end phoneme "e" until frame 32. Even if the phoneme changes at frame 33 while the energy level of the inputted voice signal is maintained, this method allows detection of the change in phoneme and finishes the processing directed by the word "ue" (upward) in frame 32.

The screen control apparatus of the present invention is not limited to those shown in the embodiments but can be modified variously.

For example, the analysis of inputted voice instructions, the extraction of extracting their features, and the discrimination of phonemes are, in the embodiments above, based on executing a 256-sample Fast Fourier Transform (FFT) based on a mel-scale 16-channel input and then inputting the result in the neural network to discriminate phonemes. However, this is not the only method. Various other widely-known analyzing methods and signal processing methods can be also applied. For example, the DTW (Dynamic Time Warping) method using a multi-template, which is often employed in voice recognition, the HMM (Hidden Markov Model) method of a statistical technique, and various other phoneme analyzing methods can be used at will.

While regular display apparatuses such as a workstation and a personal computer are shown in FIGS. 4 and 7 as display apparatuses to which the screen control apparatus according to the present invention is applied, the screen control apparatus of the present invention can be applied not only to these apparatuses but also to other display units, such as TVs on vehicles and vehicle navigation systems. The screen control apparatuses according to the present invention is even more advantageous in such environments in which manual inputting is difficult.

The types of processing corresponding to the discriminated phonemes and words are, in the embodiments, moving the pointer upward/downward and to the right/left and enlarging/reducing the window. However, various other screen operations are also possible. For example, it is possible to rotate a specific object on the display screen, to scroll the overall screen upward/downward and to the right/left, and to enlarge/reduce the screen as a whole.

The words which corresponding to the types of processing may be made any words an operator wants word to use. Of course the present invention can be applied to English words or other language word, for example, right, left, upward, downward, enlargement, reduction, and others.

The present invention can provide screen control apparatuses enabling operators to instruct the kind of processing and the amount of processing by voice directly and intuitively looking at the screen so as to change the display screen as desired and therefore offer better human interfacing.

The present invention can also provide a screen control method which enables an operator to instruct a display apparatus with both of a type and an amount of an operation.

What is claimed is:

1. A screen control apparatus for processing a movement, which is made on a screen of a picture displayed on the screen in accordance with a voice, said screen control apparatus comprising:

sound input means for receiving a voice instruction for processing of the movement of said picture on said screen and generating a sound signal;

sound recognition means for recognizing said sound signal from said sound input means to generate a recognized sound signal for indicating the processing of the movement of said picture on said screen;

sound continuation detection means for detecting the sound continuation of said sound signal from said sound input means; and screen processing means for processing the movement of said picture on said screen in a direction defined by said recognized sound signal for a period of the sound continuation of said recognized sound signal.

2. A screen control apparatus as set forth in claim 1, wherein said sound recognition means comprises sound feature extraction means for extracting a sound feature of said sound signal, and sound discrimination means for discriminating said sound signal in accordance with said extracted sound feature, said discriminated sound signals indicating said recognized sound signal for processing said picture on said screen.

3. A screen control apparatus as set forth in claim 2, wherein said sound feature extraction means extracts said sound feature of said sound signal by executing a Fourier Transform.

4. A screen control apparatus as set forth in claim 3, wherein said sound feature extraction means comprises a Fast Fourier Transform circuit analyzing said sound signal and extracting said sound feature.

5. A screen control apparatus as set forth in claim 2, wherein said sound discrimination means discriminates phonemes from said sound signal in accordance with said extracted sound feature, said discriminated phonemes indicating said recognized sound signal for processing said picture on said screen, wherein said sound continuation detection means detects a phoneme continuation, and wherein said screen processing means processes said picture in accordance with said discriminated phonemes for a time of said detected phoneme continuation.

6. A screen control apparatus as set forth in claim 5, wherein said sound discrimination means comprises a neural network including an input layer with input units corresponding to extracted sound features and an output layer with output units corresponding to phonemes to be discriminated.

7. A screen control apparatus as set forth in claim 2, wherein said sound discrimination means discriminates words from said extracted sound feature, said discriminated words indicating said recognized sound signal for processing said picture on said screen, and wherein said screen processing means processes said picture in accordance with said discriminated words for a time of said detected sound continuation.

8. A screen control apparatus as set forth in claim 2, wherein said sound discrimination means discriminates words from said extracted sound feature, said discriminated words indicating said recognized sound signal for processing said picture on said screen, wherein said sound continuation detection means detects an end phoneme continuation of said recognized words; and wherein said screen processing means processes said picture in accordance with said discriminated words for a time of said detected end phoneme continuation.

9. A screen control method of processing a movement of a displayed picture on a screen, comprising:

receiving a voice instruction for instructing a processing of the movement of said picture and generating a sound signal;

extracting a sound feature of said sound signal, discriminating said sound signal in accordance with said extracted sound feature to generate a recognized sound signal indicating the processing of the movement of said displayed picture;

detecting a sound continuation of said sound signal from said sound signal; and processing the movement of said displayed picture on said screen in accordance with said recognized sound signal for a time of said detected sound continuation.

10. A screen control method as set forth in claim 9, wherein:

said extracted sound feature includes one or more discriminating phonemes; and said processing of the movement of said displayed picture is carried out in accordance with said one or more discriminating phonemes.

11. A screen control method as set forth in claim 9, wherein:

said extracted sound feature includes one or more discriminating words; and said processing of the movement of said displayed picture is carried out in accordance with said one or more discriminating words.

12. A picture control method as set forth in claim 9, wherein a discriminating word is discriminated from said sound signal, wherein in said detecting an end phoneme continuation of said discriminated word is detected, and wherein said processing said displayed picture is carried out in accordance with said discriminated word for a time of said detected end phoneme continuation.

13. A method of controlling a screen display, comprising:

detecting a type and a sound continuation of a voice sound signal; and controlling a movement of the screen display responsive to the type of the sound signal and the sound continuation of the sound signal.

14. An apparatus, comprising:

a display unit producing a display;

a voice signal input device inputting a voice command signal; and a processing unit coupled to said input device and said display unit, and controlling a movement of said display responsive to detection of a type of the voice command signal and a sound continuation of the voice command signal.

15. A computer-readable medium encoded with a program for screen control including processing a movement of a displayed picture on a screen, the program comprising:

receiving a voice instruction for instructing a processing of the movement of said picture and generating a sound signal;

extracting a sound feature of said sound signal;

discriminating said sound signal in accordance with said extracted sound feature to generate a recognized sound signal indicating the processing of the movement of said displayed picture;

detecting a sound continuation of said sound signal from said sound signal; and processing the movement of said displayed picture on said screen in accordance with said recognized sound signal for a time of said detected sound continuation.

\* \* \* \* \*

UNITED STATES PATENT AND TRADEMARK OFFICE
CERTIFICATE OF CORRECTION

PATENT NO.:    5,933,807
DATED     :    August 3, 1999
INVENTOR(S):   Keiji FUKUZAWA It is certified that error appears in the above-identified patent and that said Letters Patent is hereby corrected as shown below:

```
On the title page: Item [75]
```

Inventor-city, change "Kanagawa" to --Kawasaki--;
Col. 3, line 49, change "t" to --t--;
      line 49, change "T" to --T--;
      line 61, change "n" to --n--;
      line 62, change "H" to --H--;
Col. 4, line 15, change "H" to --H--;
      line 19, change to "H" to --H--;
Col. 5, line 19, change to "H" to --H--;
Col. 6, line 32, change "n" to --n--;
      line 33, change to "H" to --H--; and Signed and Sealed this Twenty-fifth Day of April, 2000

Q. TODD DICKINSON

*Attest:*

*Attesting Officer*      *Director of Patents and Trademarks*